Figure 1:
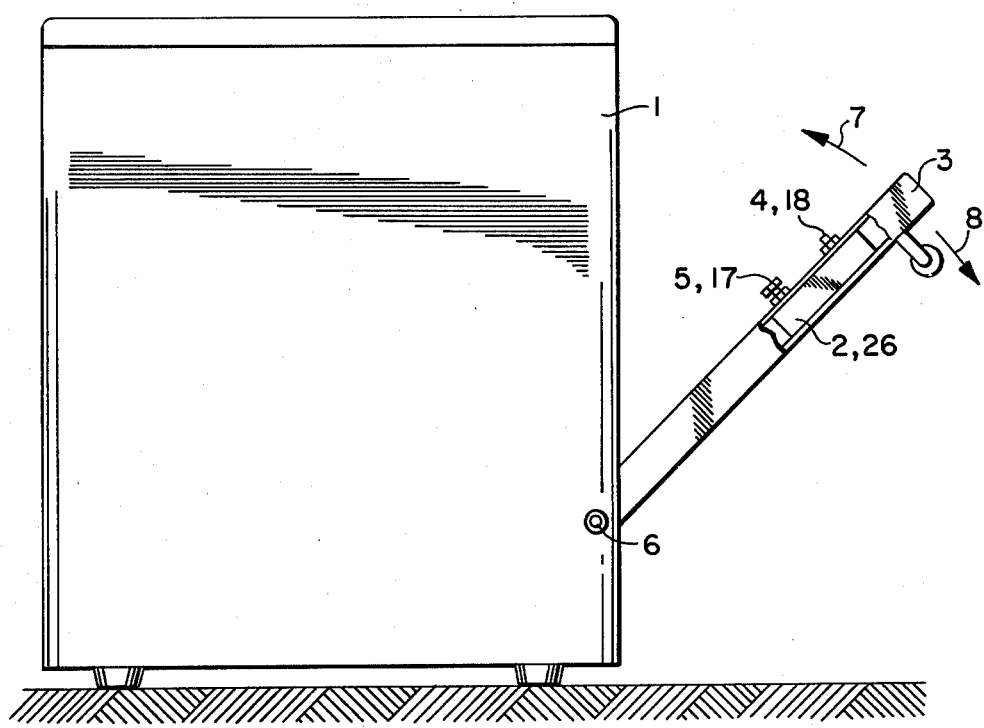

United States Patent [19]

Arnaud

[11] 4,190,181
[45] Feb. 26, 1980

[54] DISPENSING DEVICE

[75] Inventor: Gerard Arnaud, Beausoleil, France

[73] Assignee: Eaton Corporation, Cleveland, Ohio

[21] Appl. No.: 876,796

[22] Filed: Feb. 10, 1978

[30] Foreign Application Priority Data

Feb. 11, 1977 [DE] Fed. Rep. of Germany ....... 2705804
Feb. 11, 1977 [DE] Fed. Rep. of Germany ... 7704108[U]

[51] Int. Cl.² .............................................. G01F 11/26
[52] U.S. Cl. .................................. 222/456; 68/17 R; 134/120
[58] Field of Search ....................... 222/454, 455, 456; 68/17 R; 134/120

[56] References Cited

U.S. PATENT DOCUMENTS

| 2,699,886 | 1/1955 | James, Jr. | 222/454 X |
| 3,323,543 | 6/1967 | Brader | 222/454 X |
| 3,399,813 | 9/1968 | Theyssen | 222/456 X |
| 3,980,206 | 9/1976 | Hancock | 222/454 X |

Primary Examiner—Allen N. Knowles
Attorney, Agent, or Firm—R. J. McCloskey; R. A. Johnston

[57] ABSTRACT

This invention relates to an additive dispenser for use in the door of an automatic dishwashing machine. The dispenser includes a dosing chamber and a reservoir and dispenses liquid from the dosing chamber upon closing of the dishwasher door. A scooping chamber is provided on a higher level than the bottom of the reservoir such that upon opening of the door the liquid from the scooping chamber flows into the dosing chamber and is discharged from there upon reclosing of the door.

8 Claims, 6 Drawing Figures

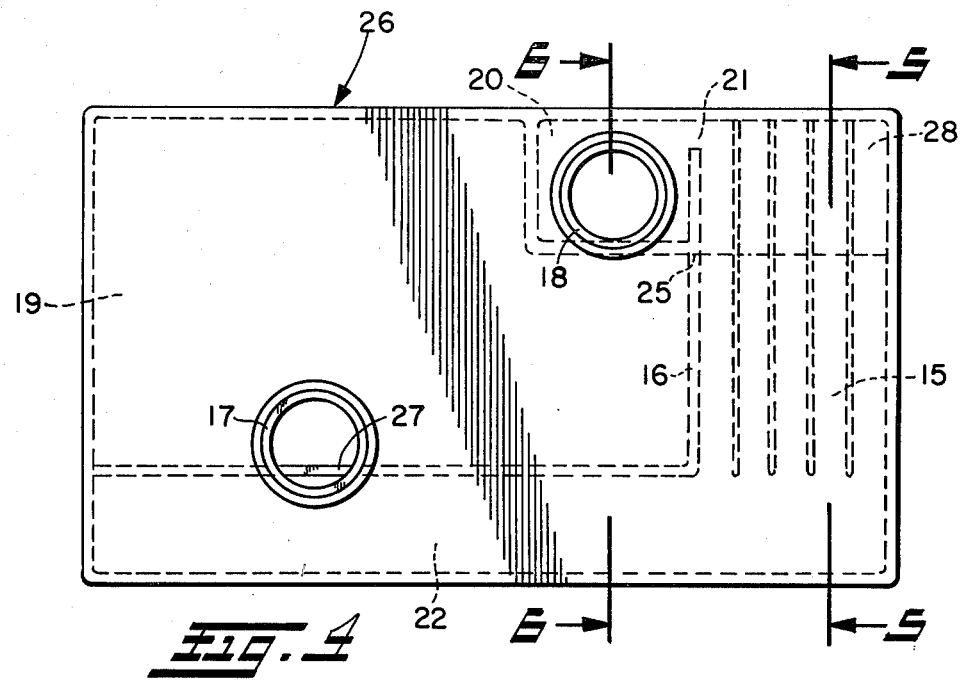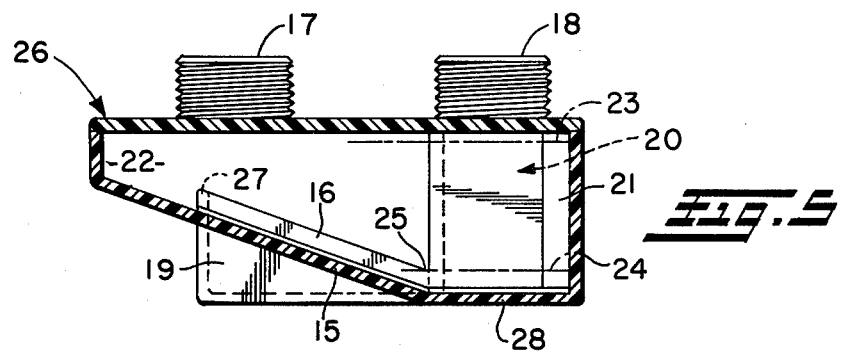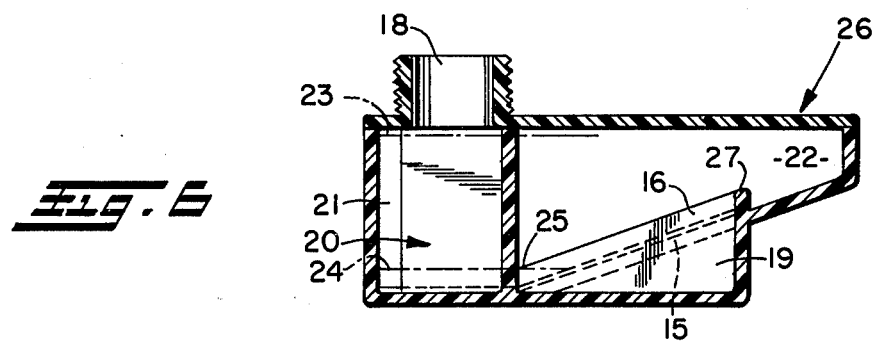

DISPENSING DEVICE

The invention relates to a dispensing device for dispensing liquid media and particulary to a dispenser adapted for being mounted in the door of a dish washer. The door of the dish washer is pivotably mounted on a horizontal pivot axis and is pivotable downwardly into a lower position and back upwardly into an upper position. The dispensing device is provided with a reservoir and a dosing chamber for placing in readiness for dispensing a measured quantity of liquid.

The space that is available in the door of a dish washer for mounting a dispenser is limited by by the depth of the door. It is desirable, however, to make the volume of a dispenser as large as possible in order to obtain intervals for refilling the dispenser with liquid medias that are as long as possible.

Dispensers as they are nowadays in use are usually provided with a dosing chamber, the object of which is to place in readiness for dispensing a predetermined quantity of the liquid medium. This quantity will be delivered by the dispenser at a desired moment.

For filling the dosing chamber with the required quantity of liquid the medium that is stored in the reservoir of the dispenser must have a sufficiently high level. In order to keep the interval for refilling the liquid medium sufficiently long the reservoir of the dispenser should be quite large otherwise the level of the medium will have dropped to a point at which the desired filling of the dosing chamber is no longer possible.

It has been proposed to arrange the bottom wall of the reservoir with an inclination towards the dosing chamber so that a maximum quantity of the liquid medium can be fed into the dosing chamber before a refilling of the reservoir becomes necessary. This has resulted, however, in the problem that the inclined bottom wall has reduced the volume of the reservoir so that an effective increase in volume of the reservoir was not attainable, particularly for the reason that the limited space in the door of the dishwasher does not allow to augment considerably the overall dimensions of the reservoir.

From U.S. Pat. No. 2,699,886 a dispenser for liquids is known in which a chamber that is separated from the reservoir by a partition is filled out of the reservoir each time the door has been tilted upwards, while it is emptied via a tubing and a small chamber each time the door has been tilted back downwardly to the lower position, on which occasion the small chamber delivers the liquid directly into the washing or rinsing chamber.

With this known device it may happen that the tube will become stuck with dried medium after some time of use. Besides the device is not provided with adjustable dosing for the quantity of delivered liquid. Furthermore the complete quantity of liquid medium of the freshly filled device can inadvertently be emptied by a suction pump effect.

It is an object of the present invention to provide a dispensing device of simple construction and reliable function that is able to store a larger quantity of the liquid medium than previously had been possible with known devices.

According to the invention this object is obtained by a dispenser which is characterized by the fact that a scooping chamber and an inclined wall are provided, that the bottom of the scooping chamber is on a higher level than the bottom of the reservoir and the bottom of the dosing chamber when the door is in its upper position and that the medium stored in the reservoir will flow into the scooping chamber and from there over the inclined wall into the dosing chamber when the door is pivoted into its lower position.

The dispenser according to the invention yields, in comparison with the state of the prior art the advantage that it may very conveniently be manufactured by moulding of plastics, whereby—at least as far as the scooping system is concerned—subsequently no additional parts need to be assembled. The device functions very reliably and is able to store a large volume of liquid medium so that refilling is required only on rare occasions.

The invention will now be explained in connection with the drawings. In the drawings FIG. 1 is a side view of a dishwasher according to the state of the prior art and provided with a dosing device, with partially opened door, FIG. 2 is a fragmentary section of a part of the door of a dishwasher and of a dosing device according to the state of the prior art, mounted in the door, FIG. 3 is an exploded view of a dosing device according to the invention without the adjusting mechanism for the dosing FIG. 4 is a plan view of the dosing device of FIG. 3, FIG. 5 is a section of the device of FIG. 3, taken along the line V—V of FIG. 4 and FIG. 6 is a section of the device of FIG. 5, taken along the line VI—VI of FIG. 5.

A dispenser for dispensing liquid media for, example detergents is usually mounted in the door 3 of an appliance 1 (FIG. 1) particularly a dishwasher. The door 3 is pivotally supported on an axis 6, it may pivoted upwardly to another position in the direction of an arrow 7 or downwardly in a lower position in the direction of an arrow 8. The dispenser 2 is threadably attached to the door 3 by means of studs 4 and 5, these studs 4 and 5 are also used for filling the dispenser 2 and for dispensing the metered quantity of the liquid.

Figure 2:
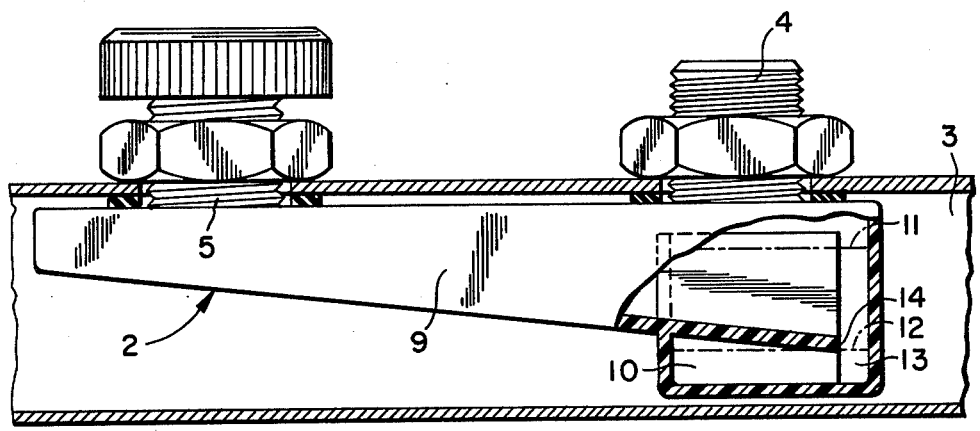

FIG. 2 shows that the bottom wall of a reservoir 9 of the dispenser 2 is inclined with regard to the horizontal plane and that it slopes down towards a dosing chamber 10. The dosing chamber 10 may be filled at 11 through a feed opening 13. When the liquid medium in the reservoir 9 has a low level, this filling is possible but only up to a level 12. Furthermore the reservoir 9 will empty rather quickly since, because of its inclined bottom wall, it cannot take advantage of the entire height as provided by the depth of the door 3.

Figure 3:
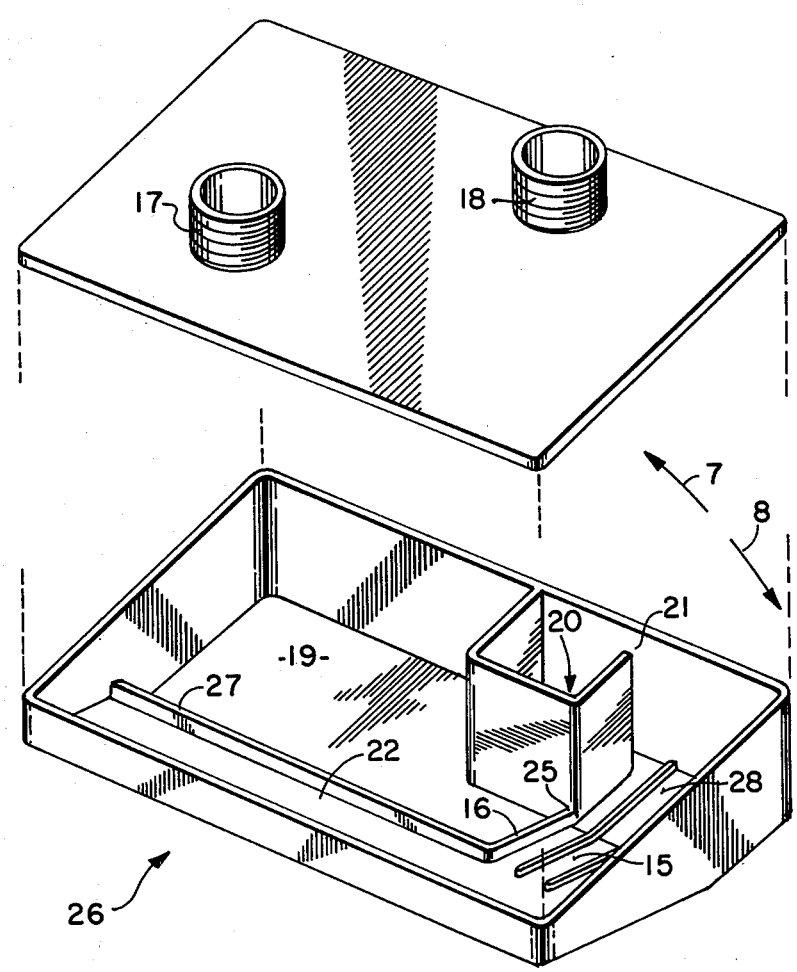

The dispenser 26 according to the invention is illustrated in an opened condition in FIG. 3 so that it may more easily be understood. The cover of the dispenser 26 is provided with two studs 17, 18 which, according to the selected mode of use, may be used for filling the dispenser of for dispensing the liquid therefrom. One of the studs 17, 18 may be dispensed with and the dispenser 26 may be made in such a way that it is adapted for being mounted in one single opening of the door lining only.

When the door 3 of the appliance 1 is open a reservoir 19 may be filled over one or both of the studs 17 and 18. After sometime of filling the liquid medium will flow over a low partition 16 (FIG. 3) onto an inclined wall 15. When overflowing the partition 16 the medium will begin to do so at a point 25, because this is the lowest point of the partition 16. This level of the liquid medium defines the lowest level of the medium below which a dosing in the dosing chamber 20 is no longer possible.

In the course of further filling the reservoir 19 the liquid medium will flow up the inclined wall 15 and flow through an inflow opening 21 into the dosing chamber 20.

The dosing chamber 20 (FIG. 3) is freshly filled in this way before each delievery of liquid medium into the interior of the appliance 1 (FIG. 1) particularly into the washing chamber of a dishwasher, and so long as the liquid medium contained in the reservoir 19 will be sufficient for this filling.

As soon as the liquid medium has attained a level which is lower than the upper rim of the partition 16 at the point 25 (FIG. 3) the liquid medium cannot flow over the partition 16. But despite of this the dosing chamber 20 can still be filled:

When the dispenser 26 is tilted upwardly with the door 3 in the direction of the arrow 7 the liquid medium in the reservoir 19 flows over a partition 27 and into a scooping chamber 22. When the door 3 is again tilted downwardly into its lower position the dispenser 26 is also tilted downwardly in the direction of the arrow 8 with the result that the liquid medium in the scooping chamber 22 will flow under the action of gravity over the inclined wall 15 and through the inflow opening 21 into the dosing chamber 20. The quantity of the medium that reaches the dosing chamber 20 is just sufficient for a regular dosing function. In the event the reservoir 19 is completely emptied the liquid medium which had previously flowed into the scooping chamber 22 is still sufficient for filling the dosing chamber 20 with the desired quantity.

Since the reservoir 19 itself need not be provided with a bottom wall that is inclined with respect to the horizontal and since its bottom wall may be arranged parallel to the door lining, a reservoir with maximum volume may be mounted in the space that is available in the door 3.

FIG. 4 shows only a top plan view of the dispenser 26.

FIGS. 5 and 6 illustrate more in detail the angle under which the partition 16 is inclined with reference to ths horizontal plane. In both FIGS. 5 and 6 the low level 24 is illustrated as it is present when ths liquid medium is just flowing over the partition 16 at the point 25. An upper level 23 indicates the complete filling of the dispenser 26. In this condition the scooping chamber 22 will be filled with liquid medium even if the door 3 is in its horizontal lower positon, this does not change the function of the dispenser as previously explained.

The bottom wall of the scooping chamber 22 (5, 6) is on a higher level than the bottom wall of the reservoir 19. Furthermore it is inclined just as the inclined wall 15 in order to enhance the flow of the liquid medium when the dispenser 26 is in its horizontal position as shwon in FIG. 3. The bottom wall of the scooping chamber 22 may additionally be inclined in direction towards the inclined wall 15 for further enhancing the flowing off of the liquid medium.

The reservoir may be comprised of a plurality of chambers or receptacles that are interconnected by passages or tubings. It must be possible for the liquid medium, however, to flow from one of these receptacles over a partition 27 into the scooping chamber.

A bottom wall 21 (FIG. 3) may be arranged in parallel relationship to the horizontal plane and may therefore extend parallel to the bottom wall of the reservoir 19, alternatively it may be at least partially a part of the inclined wall 15.

For a better understanding of the drawing means for releasing the liquid medium from the dosing chamber 20 through one of the studs 17 or 18 into the interior of the appliance 1 are not illustrated in detail, they are known to one of ordinary skill the art.

What is claimed is:

1. A dispenser device for dispensing liquid medium, particularly adapted for being mounted in the door of a dishwasher, the door of which is pivotably mounted on a horizontal pivot axis and is pivotable between a lower position and an upper position, said dispensing device being provided with a reservoir and a dosing chamber for placing in readiness for dispensing a measured quantity of liquid, characterized by the fact that a scooping chamber and an inclined wall are provided, that the bottom of the scooping chamber is on a higher level than the bottom of the reservoir when the door is in its upper position and that the medium stored in the reservoir will flow into the scooping chamber and from there over the inclined wall into the dosing chamber when the door is pivoted into its lower position.

2. A dispensing device according to claim 1, characterized by the fact that the reservoir (19) and the scooping chamber (22) are separated by a partition (27).

3. A dispensing device according to claim 1, characterized by the fact that the inclined wall (15) is separated from the reservoir (19) by a partition (16).

4. A dispensing device according to claim 1, characterized by the fact, that the bottom wall of the scooping chamber (22) is inclined with respect to the horizontal plance in the same direction of inclination as the inclined wall (15).

5. A dispensing device according to claim 1, characterized by the fact, that the bottom wall of the scooping chamber (22) is additionally inclined in the direction towards the inclined wall (15).

6. A dispensing device according to claim 1, characterized by the fact that in the area of the dosing chamber the inclined wall merges into a bottom wall part that is parallel to the horizontal plane.

7. A dispensing device according to claim 1, characterized by the fact that the bottom wall part is additionally inclined in the direction towards the dosing chamber.

8. A dispensing device according to claim 1, characterized by the fact that when using a plurality of receptacles for the reservoir at least one of these receptacles is connected with the scooping chamber and/or the inclined wall via a partition.

* * * * *